United States Patent [19]

Kim et al.

[11] Patent Number: 5,314,978

[45] Date of Patent: May 24, 1994

[54] COPOLYMER OF SULFUR DIOXIDE AND NUCLEAR-SUBSTITUTED TRIALKYLGERMYLSTYRENE

[75] Inventors: Seong-Ju Kim, Cheonranam; Ji-Hong Kim, Busan; Seong-Geun Jang; Dae-Youp Lee, both of Cheonranam, all of Rep. of Korea

[73] Assignee: Kumho Petrochemical Company, Limited, Seoul, Rep. of Korea

[21] Appl. No.: 850,261

[22] Filed: Mar. 12, 1992

[30] Foreign Application Priority Data

Mar. 28, 1991 [KR] Rep. of Korea ............... 91-4932

[51] Int. Cl.$^5$ ..................... C08G 75/22; C08G 79/00
[52] U.S. Cl. ........................ 528/9; 528/382; 528/386; 528/392
[58] Field of Search ............... 528/9, 382, 386, 25, 528/30, 32, 392

[56] References Cited

U.S. PATENT DOCUMENTS 4,965,340 10/1990 Matsuda et al. ............... 528/25

OTHER PUBLICATIONS

M. J. Bowden and L. F. Thompson, J. Electrochem. Soc., 120, 1722, 1973.
M. J. Bowden and L. F. Thompson, J. Electrochem. Soc., 121, 1620, 1974.

*Primary Examiner*—Harold D. Anderson
*Attorney, Agent, or Firm*—Birch, Stewart, Kolasch & Birch

[57] ABSTRACT

Copolymers comprising 1-50 mole % of sulfur dioxide and 50-99 mole % of trialkylgermylstyrene, having a weight average molecular weight of 500-10,000,000 and exhibiting a high sensitivity to light, electron beam, and X-ray, as well as having an excellent anti-dry etching resistance, and their application as a positive resisting material.

6 Claims, 2 Drawing Sheets

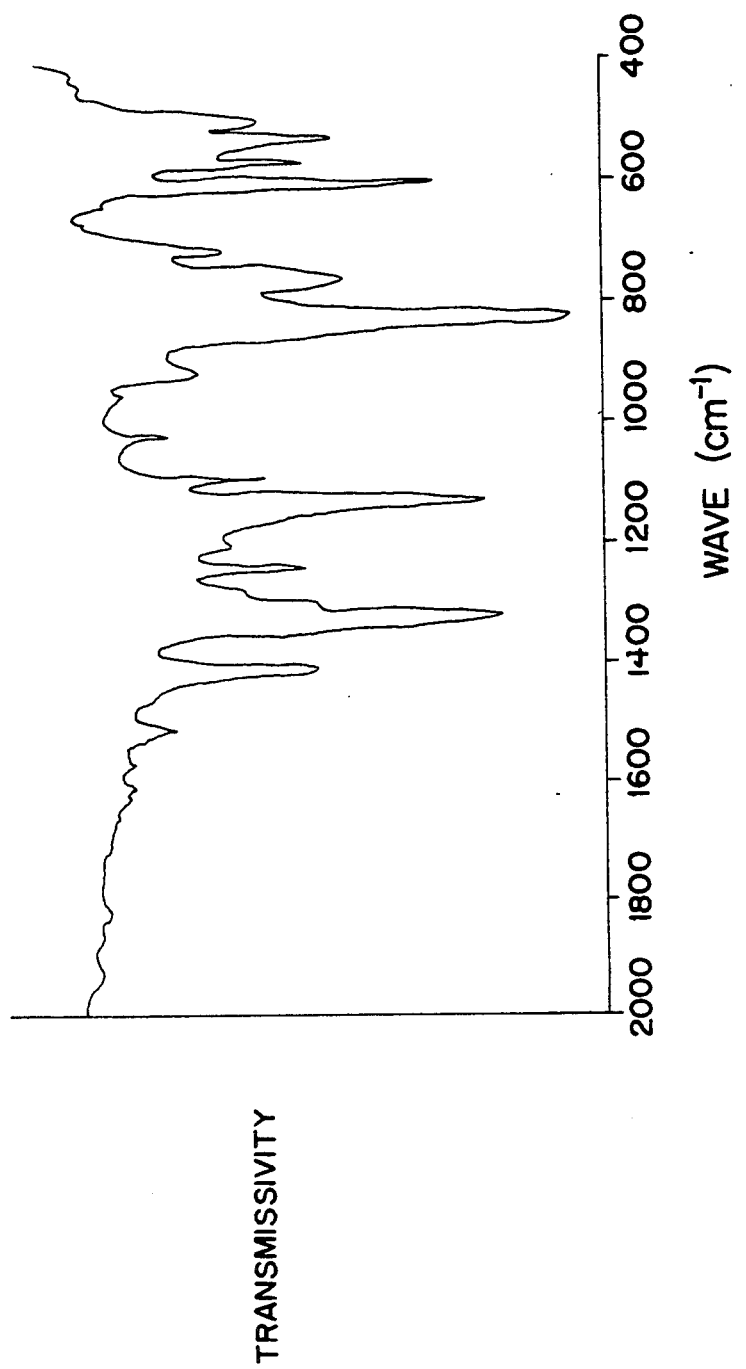

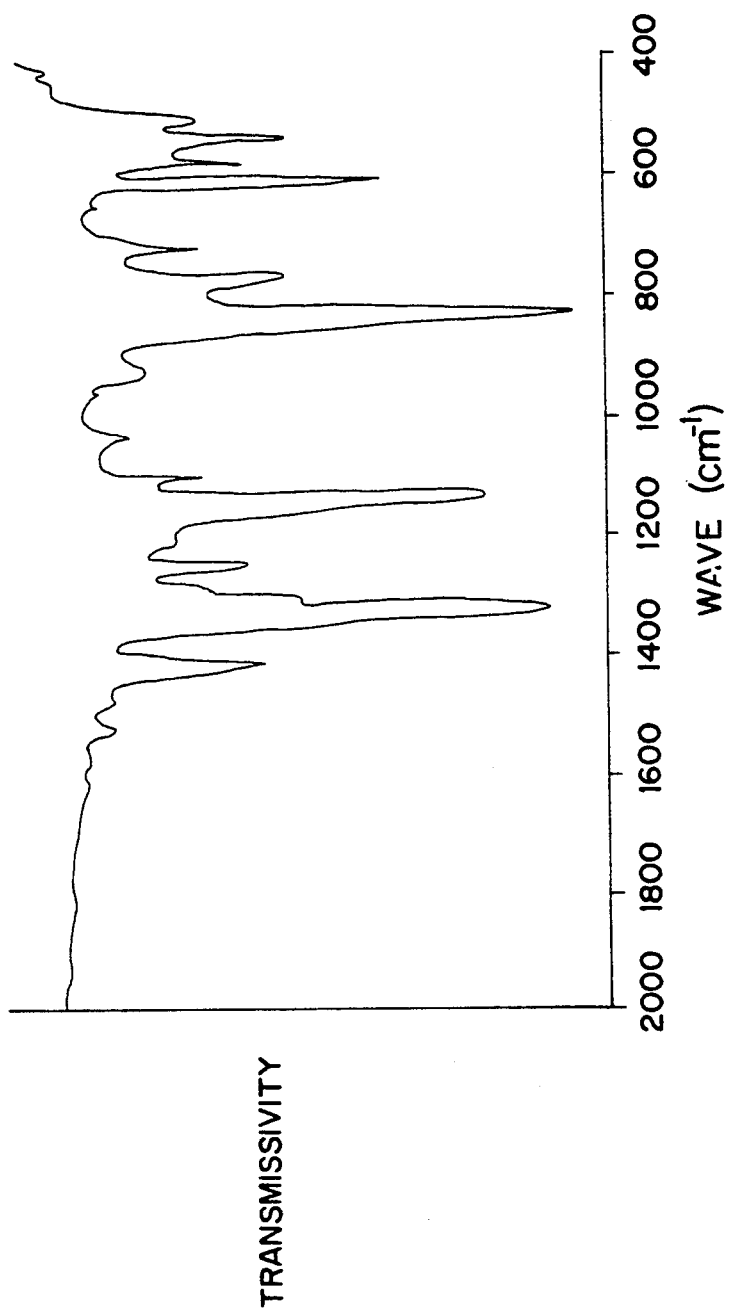

COPOLYMER OF SULFUR DIOXIDE AND NUCLEAR-SUBSTITUTED TRIALKYLGERMYLSTYRENE

BACKGROUND OF THE INVENTION

1. Field of the Invention

The present invention relates to the novel copolymers of sulfur dioxide and trialkylgermylstyrene and more particularly, to copolymers exhibiting a high sensitivity to light, electron beam, and X-ray, as well as having an excellent dry etching resistance, and their application as positive resist material.

2. Description of the Prior Art

Recent developments in LSI (Large Scale Integration) have resulted in a demand for a high performance of a high sensitivity, a submicron resolution, and dry etching resistance in their application as a positive resist material. In general, most of main chain scission type positive resist materials exhibit an internal conflict relationship between a sensitivity and an anti-dry etching resistance. That is, the higher the sensitivity of positive resist material, the lower its dry etching resistance. For example, a conventional high positive resist material exhibiting a high sensitivity is a copolymer of sulfur dioxide and olefin (M. J. Bowden and L. F. Thompson, J. Electrochem. Soc., 120, 1722, 1973). Poly(1-butene sulfone) of the copolymer of sulfur dioxide and olefin has a high sensitivity and a low dry etching resistance during electron beam irradiation. In order to give dry etching resistance characteristics to poly (olefin sulfone), a unit having an aromatic ring such as styrene is included in the poly (olefin sulfone) unit. In the prior art, when the ratio of styrene and sulfur dioxide is more than 2 in the copolymer, the resulting poly (styrene sulfone),

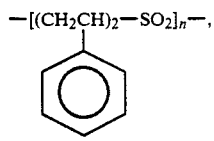

$$-[(CH_2CH)_2-SO_2]_n-,$$

is soluble in a solvent. However, this prior art copolymer exhibits a high dry etching resistance and a poor sensitivity (M. J. Bowden and L. F. Thompson, J. Electrochem. Soc., 121, 1620, 1974).

SUMMARY OF THE INVENTION

Accordingly, it is one object of the present invention to provide novel copolymers of sulfur dioxide and trialkylgermylstyrene (Formula (1)), which eliminate the above disadvantages encountered in conventional copolymers.

Another object of the present invention is to provide novel polysulfones (Formulas (2), (3), and (4)) having olefinic hydrocarbon and/or vinyl compound having an aromatic ring in the polytrialkylgermylstyrene sulfone unit.

A further object of the present invention is to provide positive resist material which comprises the above copolymers of sulfur dioxide and trialkylgermylstyrene.

Other objects and further scope of the applicability of the present invention will become apparent from the detailed description given hereinafter. It should be understood, however, that the detailed description and specific examples, while indicating preferred embodiments of the present invention, are given by way of illustration only, since various changes and modifications within the spirit and scope of the invention will become apparent to those skilled in the art from this detailed description.

Briefly described, the present invention relates to novel copolymers, each of which comprises of about 1-50 mole % of sulfur dioxide and about 50-99 mole % of trialkylgermylstyrene, has a weight average molecular weight of 500-10,000,000 and exhibits a high sensitivity to light, electron beam, and X-ray, as well as an excellent dry etching resistance, and their application as positive resist material.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 shows the IR spectrum of the poly(p-trimethylgermylstyrene sulfone) produced by Example 1 according to the present invention; and FIG. 2 shows the IR spectrum of the terpolymer produced by Example 3 according to the present invention.

DESCRIPTION OF PREFERRED EMBODIMENTS

Referring now to the present invention, there are provided novel copolymers of sulfur dioxide and trialkylgermylstyrene, each of which exhibits a high sensitivity to light, electron beam, and X-ray, as well as an excellent dry etching resistance, and their use as positive resist material.

The first embodiment of the present invention is directed to the copolymer (Formula (1)) which consists of about 1-50 mole % of sulfur dioxide units and about 50-99 mole % of trialkylgermylstyrene units. The copolymer has a weight average molecular weight of 500-10,000,000.

The second embodiment of the present invention is directed to copolymers (Formulas (2), (3), and (4)) of sulfur dioxide and trialkylgermylstyrene, which comprises:

(a) about 1-50 mole % of a sulfur dioxide unit, and (b) about 55-99 mole % of a mixture comprising (1) at least one of a aliphatic olefinic hydrocarbon and/or vinyl compound having an aromatic ring, and (2) trialkylgermylstyrene unit wherein the said aliphatic olefinic hydrocarbon is selected from the group consisting of 1-butene, 1-pentene, 1-hexene, 1-heptene, 1-octene, 1-nonene, 2-methyl-butene and 2-methyl-1-pentene, and the said vinyl compound having aromatic ring is selected from the group consisting of styrene, t-butoxystyrene, t-butylstyrene, methylstyrene and trimethoxylstyrene.

The third embodiment of the present invention is directed to the use of the copolymers of the present invention as positive resist material.

The copolymers according to the present invention are represented by the following formulas (1), (2), (3), and (4):

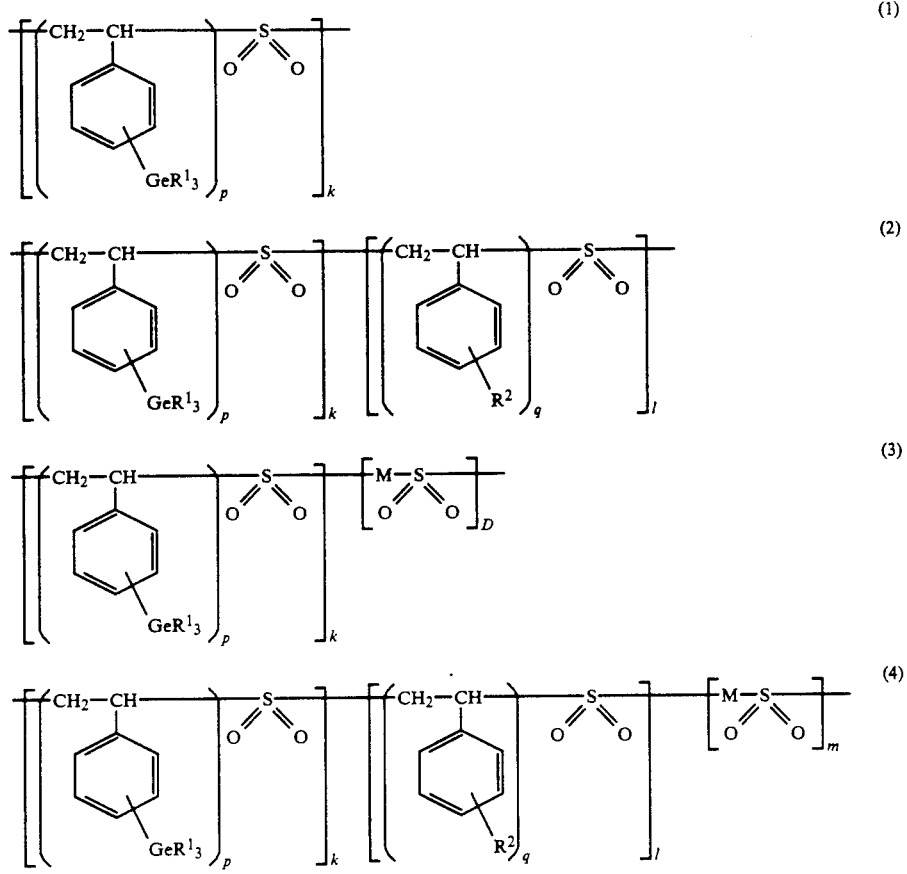

wherein $R^1$ is $CH_3$, $C_2H_5$ or $C_3H_7$; $R^2$ is H, $OC(CH_3)_3$, $C(CH_3)_3$, or $CH_3$; M is an aliphatic olefinic hydrocarbon such as 1-butene, 1-pentene, 1-hexene, 1-heptene, 1-octene, 1-nonene, 2-butene, 2-pentene, 2-methyl-1-butene or 2-methyl-1-pentene: p and q are each 1–10 integer; and k,l and m are each a molar ratio per corresponding unit and in which the copolymer units are unevenly distributed.

The present invention is directed to a process for the preparation of the a binary copolymer, Formula (1), which comprises polymerizing sulfur dioxide with trialkylgermylstyrene, and to a process for the preparation of the multiple copolymer, Formulas (2), (3), and (4), which comprises polymerizing sulfur dioxide, trialkylgermylstyrene, and at least one aliphatic olefinic hydrocarbon and/or vinyl compound having an aromatic ring.

In the process of the present invention, the polymerization initiators include most of the conventional radical initiators. For example, the polymerization is carried out in the presence of an azo compound such as azobisisobutyronitrile and/or a peroxide such as di-tert-butyl-peroxide.

The present invention is also to provide a process for producing the copolymers by use of an irradiating light in the presence or absence of the azo compound and/or peroxide initiator.

The polymerization reaction can be carried out by bulk polymerization or solution polymerization. The solvent utilized in the solution polymerization, generally, is selected from the group consisting of 0-dichlorobenzene, chlorobenzene, dichloromethane, and pyridine. Particularly, pyridine can be used to produce low molecular weight copolymers. The temperature at which the polymerization is conducted is about $-100°$ C. to $100°$ C., depending on the molecular weight and the composition ratio of the objective copolymer, and especially, the composition ratio has a close relationship with the polymerization temperature. For example, in the above formulas (1) to (4), in the case of styrene derivatives, p and q gradually decrease as the polymerization temperature decreases. However, the poly (olefin sulfone) unit of

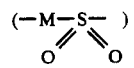

does not depend on the polymerization temperature, and the ratio shows olefin:sulfone=1:1.

The composition of the copolymers according to the present invention is influenced by the type and the mixing ratios of the sulfur dioxide and the olefinic hydrocarbon or the vinyl compound, the polymerization temperature, and the type and amount of solvent used during polymerization. And the molecular weight of the copolymers according to the present invention is influenced by the type and the amount of initiator used during polymerization, the polymerization temperature, and the type and the amount of the polymerization solvent used. Accordingly, the copolymers can be obtained of which weight average molecular weight is about 500–10,000,000, and which has a particular unit by adjusting the above conditions properly. In the case of using the copolymer of the invention as the resisting material, the weight average molecular weight is preferably in the range of 50,000–5,000,000.

A preferred good solvent of the present invention is methylisobutylketone, acetone, methylcellosolveacetate, methylethylketone, cyclohexanone, 1,4-dioxane, dichloromethane, chlorobenzene, amylacetate, or tetrahydrofuran and the poor solvent of the present invention is methanol, ethanol, 2-methoxyethanol, or isopropanol.

The copolymers according to the present invention include the styrene unit having a germyl group. The resist layer which forms by the copolymer having germyl group or aromatic ring has excellent resistance against plasma etching. That is, when the plasma etching is carried out, a protecting layer forms due to the decomposition and cross linking between the aromatic rings. Also, a $GeO_x$ layer forms on the surface of the resist because the germyl group is oxidized by the oxygen plasma.

Resist using the germanium-containing polysulfone according to the present invention has a higher resistance against oxygen plasma than a silicon-containing resist having a similar structure, since the germanium compound has a higher boiling point, which makes it difficult to volatilize and to form $GeO_x$ layer with greater ease. In addition, since the copolymers according to the present invention each includes a main chain containing a C—S bond of low bond energy, the positive resist has an excellent sensitivity and high scission efficiency to radiation rays such as ultraviolet ray, deep ultraviolet ray, X-ray, or electron beam.

The present invention will now be described in more detail in connection with the following examples which should be considered as being exemplary of, but should not be considered as limiting the present invention.

EXAMPLE 1

22 g of p-trimethylgermyl styrene and 0.4 g of tert-butyl hydroperoxide are charged into a 100 ml pressure resisting glass polymerization reactor. Oxygen is expelled from the reactor, 6.4 g of sulfur dioxide dried on $P_2O_5$ is introduced into the reactor, the reactor is sealed, and the contents contained in the reactor are stirred. P-trimethylgermyl styrene is produced by Grignard reaction of p-bromostyrene and trimethylgermyl chloride. The polymerization reactor is placed in a methanol bath at a temperature of $-65°$ C. for 16 hours to complete the polymerization. After opening the reactor, the unreacted sulfur dioxide is removed from the polymerized product.

Thereafter, acetone is introduced to the remaining polymerized product in the reactor and the unified mixture is placed into methanol with stirring, so as to precipitate a resulting white copolymer. The resulting copolymer is washed by methanol and dried at room temperature for 24 hours. At this time, 7.3 g of the binary copolymer is obtained. FIG. 1 shows the IR spectrum of this copolymer. From the IR spectrum and the elementary analysis, the copolymer is known to be a binary copolymer of p-trimethylgermylstyrene-sulfone and the composition of the copolymer is comprised of 51 mole % of p-trimethylgermylstyrene unit and 49 mole % of sulfur dioxide unit. Also, from a GPC analysis, this copolymer has an weight average molecular weight of 340,000 based on polystyrene. The degree of the dispersion ($\overline{M}_w/\overline{M}_n$) of this copolymer is 2.3.

EXAMPLE 2

11 g of p-trimethylgermylstyrene, 0.04 g of azobisisobutyronitrile, and 11 ml of 0-dichlorobenzene are charged into a 100 ml pressure resisting glass reactor. Oxygen is expelled from the reactor, 3.2 g of sulfur dioxide is introduced into the reactor and the contents contained in the reactor are mixed together. The reactor is placed into a thermostatic water bath at a temperature of 60° C. for 10 hours so as to complete the polymerization. Thereafter, 3.5 g of the resulting copolymer is prepared in the same manner as described in the following treatment of Example 1.

As a result of an IR spectrum analysis of this copolymer, an absorption band having high intensity, appeared at 1130 $cm^{-1}$ and 1320 $cm^{-1}$ due to the stretching of sulfur dioxide. The resulting copolymer is p-trimethylgermyl-styrene-sulfone as determined by IR spectrum and elementary analysis, and its composition consists of 63 mole % of p-germylstyrene unit and 27 mole % of sulfur dioxide. And also, the weight average molecular weight of the copolymer is 270,000 and its degree of dispersion ($\overline{M}_w/\overline{M}_n$) is 2.0.

EXAMPLE 3

8.7 g of p-trimethylgermylstyrene, 3.3 g of 2-methyl-1-pentene, and 0.45 g of t-butylhydroperoxide are charged into a 100 ml pressure resisting glass reactor. Oxygen is expelled from the reactor and 20.2 g of sulfur dioxide is mixed with the initial mixture in the reactor. The reactor is placed in a methanol base at a temperature of $-65°$ C. for 19 hours to complete the polymerization. Thereafter, 4.5 g of copolymer is prepared in the same manner as described in the following treatment of Example 1. FIG. 2 shows the IR spectrum of the copolymer.

As a result, this copolymer is a ternary copolymer of p-trimethylgermylstyrene-2-methyl-1-pentene-1-sulfone and the composition consists of 36 mole % of p-trimethylgermylstyrene unit, 14 mole % of 2-methyl-1-pentene unit, and 50 mole % of sulfur dioxide. A weight average molecular weight of this ternary copolymer is 210,000 and its degree of dispersion ($\overline{M}_w/\overline{M}_n$) is 1.8.

COMPARING EXAMPLE 1

The binary copolymer produced from Example 1 is dissolved in methylcellosolvacetate to make 5.0% by weight of an initial solution and is filtered by a 0.2 μm filter. This initial solution is coated on a silicon wafer using a spin coater and is prebaked at a temperature of 150° C. for 5 minutes to complete a resisting layer having a thickness of 0.5 μm. The resisting layer is irradiated by an electron beam of 20 KV by using an electron beam exposure apparatus.

Thereafter, the treated resisting layer is developed by using a mixture of methylisobutylketone/isopropanol=2.3/1 by volume ratio for 60 minutes and is rinsed in isopropanol for 30 minutes. The rinsed resisting layer is baked in an oven of 150° C. for 10 minutes. At this time, the sensitivity of the resisting layer was $1 \times 10$ μC/$cm^2$.

Also, the etching resistance of this copolymer is 500 Å/min under $CF_4$ +5% $O_2$ gas, a flow rate of 200 ml/min, and a pressure of 10 pa through a parallel plate etching apparatus. In order to compare with a binary copolymer of trimethyl-silistyrene-sulfone, this conventional binary copolymer is measured under the same condition as the copolymer of the present invention and the etching resistance obtained is 540 Å/min.

In the present invention being thus described, it will be obvious that the same may be varied in many ways. Such variations are not to be regarded as a departure from the spirit and scope of the present invention, and all of such modifications as would be obvious to one skilled in the art are intended to be included in the scope of the following claims.

What is claimed is:

1. A copolymer of sulfur dioxide and trialkylgermylstyrene, which comprises:
   (a) about 1–50 mole % of a sulfur dioxide unit; and
   (b) about 50–99 mole % of a trialkylgermylstyrene unit;
   wherein the copolymer has a weight average molecular weight of 500–10,000,000 and is represented by units having the formula (1):

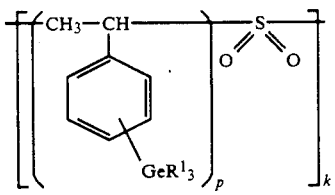

wherein $R^1$ is $CH_3$, $C_2H_5$, $C_3H_7$; and k is a molar ratio.

2. A positive resist material, which is comprised of the copolymer of claim 1.

3. A copolymer of sulfur dioxide and trialkylgermylstyrene, which comprises:
   (a) about 1–50 mole % of a sulfur dioxide unit; and
   (b) about 55–99 mole % of a mixture comprising
      (I) at least one unit of an aliphatic olefinic hydrocarbon or a unit of a vinyl compound having an aromatic ring or a mixture thereof, and
      (II) a trialkylgermylstyrene unit;
   wherein the copolymer units are represented by formulas (2), (3), and (4)

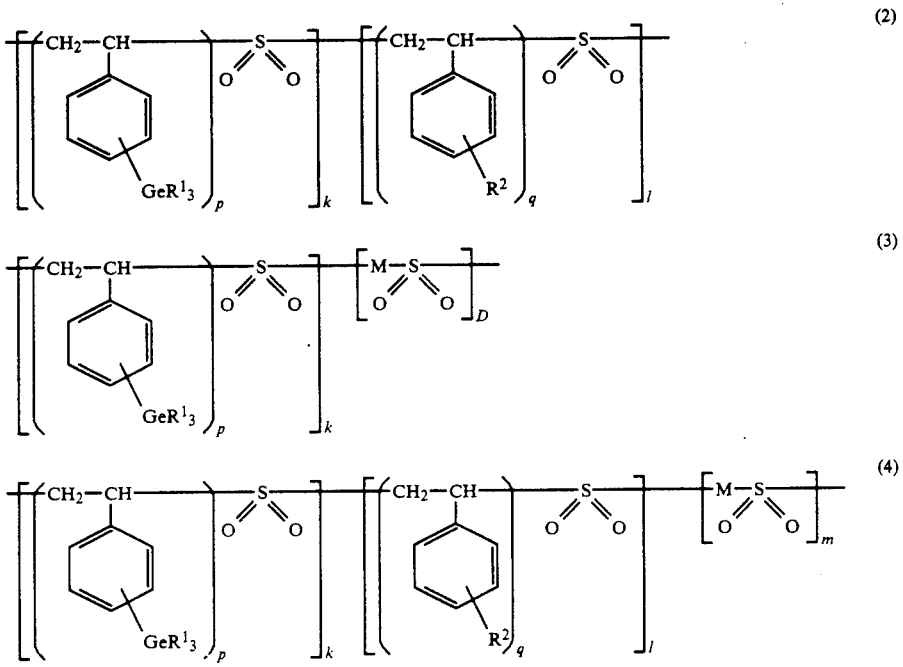

wherein $R^1$ is $CH^3$, $C_2H_5$; or $C_3H_7$; $R^2$ is H, $OC(CH_3)_3$, $C(CH_3)_3$ or $CH_3$; M is an aliphatic olefinic hydrocarbon unit, and k, m, and l are each a molar ratio, and p and q are each an integer of 1–10.

4. The copolymer of claim 3, wherein the said aliphatic olefinic hydrocarbon is selected from the group consisting of 1-butene, 1-pentene, 1-hexene, 1-heptene, 1-octene, 1-nonene, 2-methyl-1-butene, and 2-methyl-1-pentene.

5. The copolymer of claim 3, wherein the said vinyl compound is selected from the group consisting of styrene, t-butoxystyrene, t-butylstyrene, methylstyrene, and trimethylsilylstyrene.

6. A positive resist material, which is comprised of the copolymers of claim 3.